United States Patent
Haase et al.

(10) Patent No.: US 8,797,330 B1
(45) Date of Patent: Aug. 5, 2014

(54) SYSTEMS AND METHODS FOR DETECTING AND ANIMATING CHANGES IN APPLICATION STATE

(71) Applicant: Google Inc., Mountain View, CA (US)

(72) Inventors: Chet Haase, Pleasanton, CA (US); Romain Guy, Millbrae, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/057,025

(22) Filed: Oct. 18, 2013

(51) Int. Cl.
G06T 13/00 (2011.01)

(52) U.S. Cl.
USPC .......................................... 345/473; 345/474

(58) Field of Classification Search
CPC ......... G06T 13/00; G06T 13/40; G06T 13/10; G06T 13/20; G06T 13/80
USPC .................................................. 345/473, 474
See application file for complete search history.

(56) References Cited

U.S. PATENT DOCUMENTS

| | | | |
|---|---|---|---|
| 5,652,714 A | 7/1997 | Peterson et al. | |
| 6,209,120 B1 * | 3/2001 | Kurshan et al. | 716/102 |
| 7,379,065 B2 | 5/2008 | Rabb, III | |
| 7,383,515 B2 | 6/2008 | Bardon et al. | |
| 7,426,691 B2 | 9/2008 | Novak et al. | |
| 8,314,801 B2 | 11/2012 | Young et al. | |
| 8,553,038 B2 * | 10/2013 | Platzer et al. | 345/473 |
| 8,610,722 B2 * | 12/2013 | Boda et al. | 345/473 |
| 2006/0221081 A1 | 10/2006 | Cohen et al. | |
| 2009/0219294 A1 | 9/2009 | Young et al. | |

* cited by examiner

Primary Examiner — Kimbinh T Nguyen
(74) Attorney, Agent, or Firm — McDonnell Boehnen Hulbert and Berghoff (57) ABSTRACT

An operating system may receive transition information indicating that a user-interface of an application is to be transitioned from a first state to a second state. Transition of the user-interface from the first state to the second state comprises a change in a property of a user-interface item. The operating system may, in response to receiving the transition information, obtain from a rendering engine a value for the property of the user-interface item corresponding to the first state. The operating system may embed a module in the rendering engine so as to detect the change in the property of the user-interface item through communication from the application to the rendering engine; and obtain from the module a respective value for the property of the user-interface item corresponding to the second state. The operating system may generate an animation based on a comparison between the value and the respective value.

20 Claims, 5 Drawing Sheets

COMPUTER PROGRAM PRODUCT 400

SIGNAL BEARING MEDIUM 401

PROGRAM INSTRUCTIONS 402

- RECEIVING, AT AN OPERATING SYSTEM, TRANSITION INFORMATION INDICATING THAT A USER-INTERFACE OF AN APPLICATION OF A PLURALITY OF APPLICATIONS IS TO BE TRANSITIONED FROM A FIRST STATE TO A SECOND STATE, WHERE THE USER-INTERFACE COMPRISES A PLURALITY OF USER-INTERFACE ITEMS, AND WHERE TRANSITION OF THE USER-INTERFACE FROM THE FIRST STATE TO THE SECOND STATE COMPRISES A CHANGE IN A PROPERTY OF A USER-INTERFACE ITEM OF THE PLURALITY OF USER-INTERFACE ITEMS

- IN RESPONSE TO RECEIVING THE TRANSITION INFORMATION, THE OPERATING SYSTEM OBTAINING FROM A RENDERING ENGINE A VALUE FOR THE PROPERTY OF THE USER-INTERFACE ITEM CORRESPONDING TO THE FIRST STATE

- THE OPERATING SYSTEM EMBEDDING A MODULE IN THE RENDERING ENGINE SO AS TO DETECT THE CHANGE IN THE PROPERTY OF THE USER-INTERFACE ITEM THROUGH COMMUNICATION FROM THE APPLICATION TO THE RENDERING ENGINE

- THE OPERATING SYSTEM OBTAINING FROM THE MODULE A RESPECTIVE VALUE FOR THE PROPERTY OF THE USER-INTERFACE ITEM CORRESPONDING TO THE SECOND STATE

- GENERATING AN ANIMATION BASED ON A COMPARISON BETWEEN THE VALUE AND THE RESPECTIVE VALUE; AND CAUSING THE RENDERING ENGINE TO RENDER THE ANIMATION SUCH THAT THE ANIMATION IS PLAYABLE TO TRANSITION THE USER-INTERFACE FROM THE FIRST STATE TO THE SECOND STATE

| COMPUTER READABLE MEDIUM 403 | COMPUTER RECORDABLE MEDIUM 404 | COMMUNICATIONS MEDIUM 405 |

FIGURE 4

SYSTEMS AND METHODS FOR DETECTING AND ANIMATING CHANGES IN APPLICATION STATE

BACKGROUND

An electronic device may include several software applications. A user may interact with a given software application using a graphical user-interface (GUI). A GUI may include different visual elements that facilitate interaction with the software. For instance, a GUI of a form-based application may include various widgets such as text, text fields, buttons, list boxes, and checkboxes, which can be filled out, selected, and clicked. A user may click a "Submit" button, for example, causing the GUI to disappear and another different GUI to appear that may include more text fields, more information, more buttons, or new items in different places.

SUMMARY

The present disclosure describes embodiments that relate to systems and methods for detecting and animating changes in application state. In one aspect, the present disclosure describes a method performed by a device having an operating system and a plurality of applications. The method comprises receiving, at the operating system, transition information indicating that a user-interface of an application of the plurality of applications is to be transitioned from a first state to a second state. The user-interface comprises a plurality of user-interface items, and transition of the user-interface from the first state to the second state comprises a change in a property of a user-interface item of the plurality of user-interface items. The method also comprises, in response to receiving the transition information, the operating system obtaining from a rendering engine a value for the property of the user-interface item corresponding to the first state. The method further comprises the operating system embedding a module in the rendering engine so as to detect the change in the property of the user-interface item through communication from the application to the rendering engine; and the operating system obtaining from the module a respective value for the property of the user-interface item corresponding to the second state. The method also comprises generating an animation based on a comparison between the value and the respective value; and causing the rendering engine to render the animation such that the animation is playable to transition the user-interface from the first state to the second state.

In another aspect, a computer readable memory having stored thereon instructions that, when executed by one or more processors of a computing device having a plurality of applications, cause the computing device to perform functions is described. The functions comprise receiving transition information indicating that a user-interface of an application of the plurality of applications is to be transitioned from a first state to a second state. The user-interface comprises a plurality of user-interface items, and transition of the user-interface from the first state to the second state comprises a change in a property of a user-interface item of the plurality of user-interface items. The functions further comprise, in response to receiving the transition information, obtaining from a rendering engine a value for the property of the user-interface item corresponding to the first state. The functions also comprise embedding a module in the rendering engine so as to detect the change in the property of the user-interface item through communication from the application to the rendering engine; and obtaining from the module a respective value for the property of the user-interface item corresponding to the second state. The functions further comprise generating an animation based on a comparison between the value and the respective value; and causing the rendering engine to render the animation such that the animation is playable to transition the user-interface from the first state to the second state.

In still another aspect, a device having a plurality of applications is described. The device comprises one or more processors. The device also may comprise a memory storing instructions, that when executed by the one or more processors, cause the device to perform functions. The functions comprise receiving transition information indicating that a user-interface of an application of the plurality of applications is to be transitioned from a first state to a second state. The user-interface comprises a plurality of user-interface items, and transition of the user-interface from the first state to the second state comprises a change in a property of a user-interface item of the plurality of user-interface items. The functions further comprise, in response to receiving the transition information, obtaining from a rendering engine a value for the property of the user-interface item corresponding to the first state. The functions also comprise embedding a module in the rendering engine so as to detect the change in the property of the user-interface item through communication from the application to the rendering engine; and obtaining from the module a respective value for the property of the user-interface item corresponding to the second state. The functions further comprise generating an animation based on a comparison between the value and the respective value; and causing the rendering engine to render the animation such that the animation is playable to transition the user-interface from the first state to the second state In still another aspect, the present disclosure describes a device. The device comprises a means for receiving transition information indicating that a user-interface of an application of the plurality of applications is to be transitioned from a first state to a second state. The user-interface comprises a plurality of user-interface items, and transition of the user-interface from the first state to the second state comprises a change in a property of a user-interface item of the plurality of user-interface items. The device also comprises means for, in response to receiving the transition information, obtaining from a rendering engine a value for the property of the user-interface item corresponding to the first state. The device further comprises means for embedding a module in the rendering engine so as to detect the change in the property of the user-interface item through communication from the application to the rendering engine; and obtaining from the module a respective value for the property of the user-interface item corresponding to the second state. The device also comprises means for generating an animation based on a comparison between the value and the respective value; and causing the rendering engine to render the animation such that the animation is playable to transition the user-interface from the first state to the second state.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In examples, a computing device (e.g., a mobile telephone, personal digital assistant (PDA), laptop, notebook, or netbook computer, tablet computing device, a wearable computing device, etc.) may include multiple software applications, and each software application may have a user-interface to enable interaction with a user of the computing device. The user-interface may have multiple visual user-interface items or widgets such as buttons, scroll bars, menus, graphical objects, and other means of facilitating user interaction.

User-interface items may have multiple states. The states may include enabled, disabled, pressed or not pressed, unchecked or indeterminate, etc. A check box, for example, may appear empty when unchecked and with a checkmark glyph when checked. Some user-interfaces may allow the visual elements to appear differently based on a current state of the elements. For example, a button may be colored blue when pressed and white when not pressed. Many other states and possible state changes are possible. Furthermore, a user-interface may allow for various transitions between states. In some cases, a user may be able to specify properties of the transition such as how long the transition should last, or how the visual element should appear before and after the transition.

In some examples, a user-interface may also allow for animations during transitions between states. Animations are a series of graphical representations that typically start at a current state of a visual element (e.g. "pressed"), and animate a series of changes that transition the visual element to a new state (e.g. "not pressed"). In examples, such transition animations may be hard-coded for each state change, and may be specific to the type of transition being used. Furthermore, transition animations may be rewritten each time a change is made to state properties of the visual element.

Developers of software applications may face a tedious task of having to manually code animated transitions between screens. The developers may hardcode effects that occur on components and logic that results in such effects. Multiple effects may involve more code to be written by the developers. While these transitions provide users a richer environment to operate in, the burden placed on the developers may become a barrier to utilization of the animated transitions. Consequently, the use of animated transitions between screens may not as prevalent as would be otherwise. In order to alleviate the burden imposed on developers, systems and methods can be implemented to shift the burden to operating systems/platforms of devices to enable transitions in a simplified manner without input (or without direct communication) from an application or the developer of the application.

Figure 1:
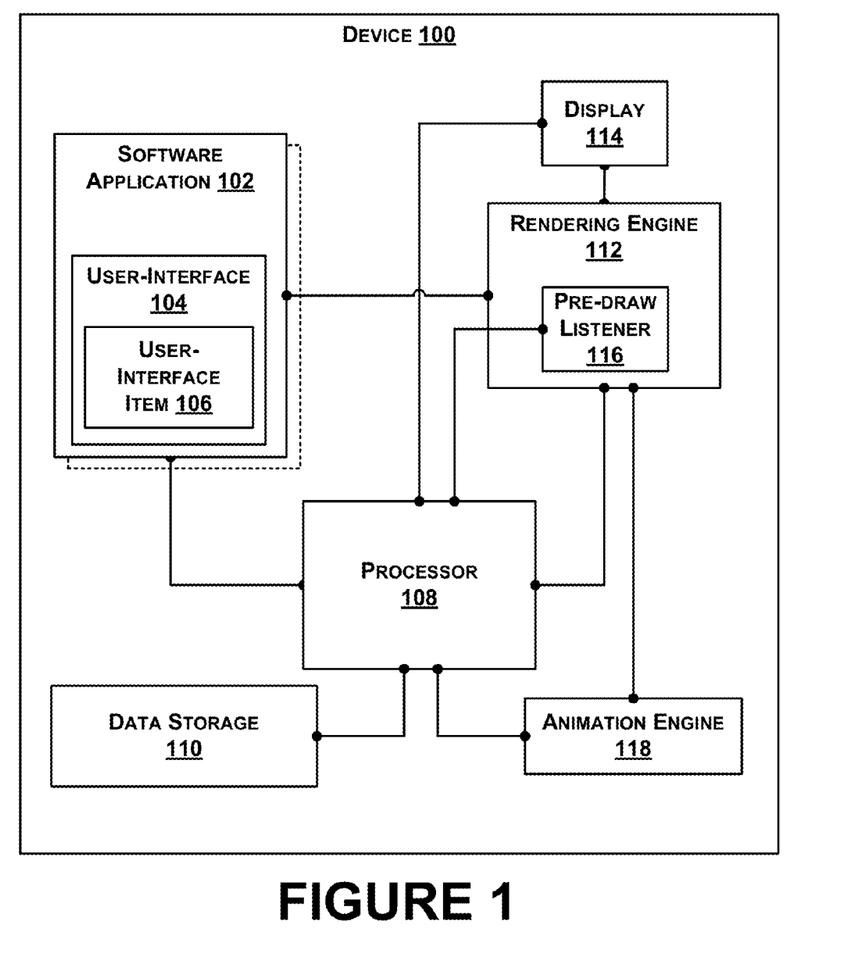
FIG. 1 illustrates a device configured for generating an animation for transition of a user-interface of an application from a first state and a second state, in accordance with an example embodiment.

Referring now to the Figures, FIG. 1 illustrates a device 100 configured for generating an animation for transition of a user-interface of an application from a first state and a second state, in accordance with an example embodiment. The device 100 (e.g., a mobile telephone, personal digital assistant (PDA), laptop, notebook, or netbook computer, tablet computing device, a wearable computing device, etc.) includes multiple software applications such as software application 102. The software application 102 may include a user-interface 104 that has multiple user-interface items such as user-interface item 106 (e.g., an on-screen button).

The device 100 may also include a processor 108 coupled to a data storage 110 that may have computer-readable program instructions, for example. The processor 108 can include one or more general-purpose processors and/or one or more special purpose processors (e.g., digital signal processors, application specific integrated circuits, etc.). The processors 108 can be configured to execute computer-readable program instructions that may be contained in the data storage 110 and/or other instructions. For example, an operating system of the device may be stored in the data storage 110 and may be executed by the processor 108. The processor 108 upon execution of the operating system may be configured to manage hardware resources of the device and provide common services for a plurality of software applications, such as the software application 102 running on the device.

The data storage 110 can include one or more computer-readable storage media that can be read and/or accessed by at least one of processors 108. The one or more computer-readable storage media can include volatile and/or non-volatile storage components, such as optical, magnetic, organic or other memory or disc storage, which can be integrated in whole or in part with at least one of the processors 108. In some examples, the data storage 110 can be implemented using a single physical device (e.g., one optical, magnetic, organic or other memory or disc storage unit), while in other examples, the data storage 110 can be implemented using two or more physical devices. The data storage 110 can include computer-readable program instructions and perhaps additional data, such as but not limited to data used by one or more processes and/or threads of a software application such as the software application 102.

As described above, applications that have animations may provide a user with a richer, more interactive, and more useful experience than non-animated applications. Animations can be used to help the user understand changes in potentially complicated user-interfaces, and to help the user understand and process the flow of logic through an application. Application developers, meanwhile, may be inclined to focus on business logic on an application, and may not have time or skills to develop and code animations. A system that can provide such animations without input from the application, and thus no input from the application developer, may alleviate the burden from developers. Computer-readable program instructions in the data storage 110 may, when executed by the processor 108, cause the device 100 to provide for such capability (i.e., generating animation for transition of the user-interface 104 without input from the software application 102).

For example, the processor 108 may be configured to receive an indication of an imminent transition of the user-interface 104 from a first state to a second state. The processor 108 may be in communication with a rendering engine 112 that is configured to render the use-interface 104 on a display 114. The processor 108 may be configured to capture a current state (i.e., start state or a first state) of the user-interface 104. For example, the user-interface item 106 may have a visual property that has a certain value (e.g., size of a button, a color of the button, location of the button, etc.) in the first state. The processor 108 may be configured to capture such a value while the user-interface 104 is in the first state. For instance, the processor 108 may be configured to communicate with the rendering engine 112 to obtain the value associated with the visual property as currently rendered on the display 114.

The processor 108 also, at this time, may be configured to add a listener 116 to the rendering engine 112, which may be configured to request to be called back prior to the next time or next instance the user-interface 104 is drawn or rendered on the display 114 (i.e., prior to drawing the user-interface 104 in the second state). Thus, the listener 116 may be referred to as a "pre-draw listener."

As a result of the transition from the first state to the second state, changes may occur to user-interface items of the user-interface 104. For example, the user-interface item 106 may be removed or changed, and other items may be added. The software application 102 may be configured to provide to the rendering engine 112 information indicative of layout of the user-interface 104 in the second state to be rendered on the display 114. The pre-draw listener 116 may be configured to observe and/or monitor communication between the software application 102 and the rendering engine 112. Before rendering of the user-interface in the second state occurs, the pre-draw listener 116 is called back to provide to the processor 108 information indicative of changes to the user-interface 104. For example, the processor 108 may receive from the pre-draw listener 116 a value of the visual property of the user-interface item 106 in the second state.

The processor 108 may be coupled to an animation engine 118. The processor 108 may be configured to compare values of the visual property of user-interface item 106 in the first state and the second state or may be configured to provide the values to the animation engine 118 to perform the comparison. Based on the comparison, the animation engine 118 may be configured to generate an animation comprising a series of frames, for example. Layouts of the frames (e.g., values of visual properties and locations of various user-interface items of the user-interface 104) may be provided to the rendering engine 112 either directly or through the processor 108. In some examples, the animation engine 118 may be a part of the rendering engine 112. The rendering engine 112 may be configured to output the frames on the display 114 so as to render the animation such that the animation is playable to transition the user-interface 104 from the first state to the second state. In this manner, the animation of the transition may be performed without input (or without direct communication) from the software application 102, i.e., without tying resources of the software application 102 or without addition code written for the software application 102 to perform the animation.

Components of the device 100 may be configured to work in an interconnected fashion with each other and/or with other components coupled to respective systems. One or more of the described functions or components of the device 100 may be divided up into additional functional or physical components, or combined into fewer functional or physical components. In some further examples, additional functional and/or physical components may be added to the examples illustrated by FIG. 1. Still further, any of the rendering engine 112 and/or the animation engine 118 may include software modules and/or be provided in the form of a processor (e.g., a microprocessor, a digital signal processor (DSP), etc.) configured to execute program code including one or more instructions for implementing logical functions described herein. The device 100 may be included within other systems.

Figure 2:
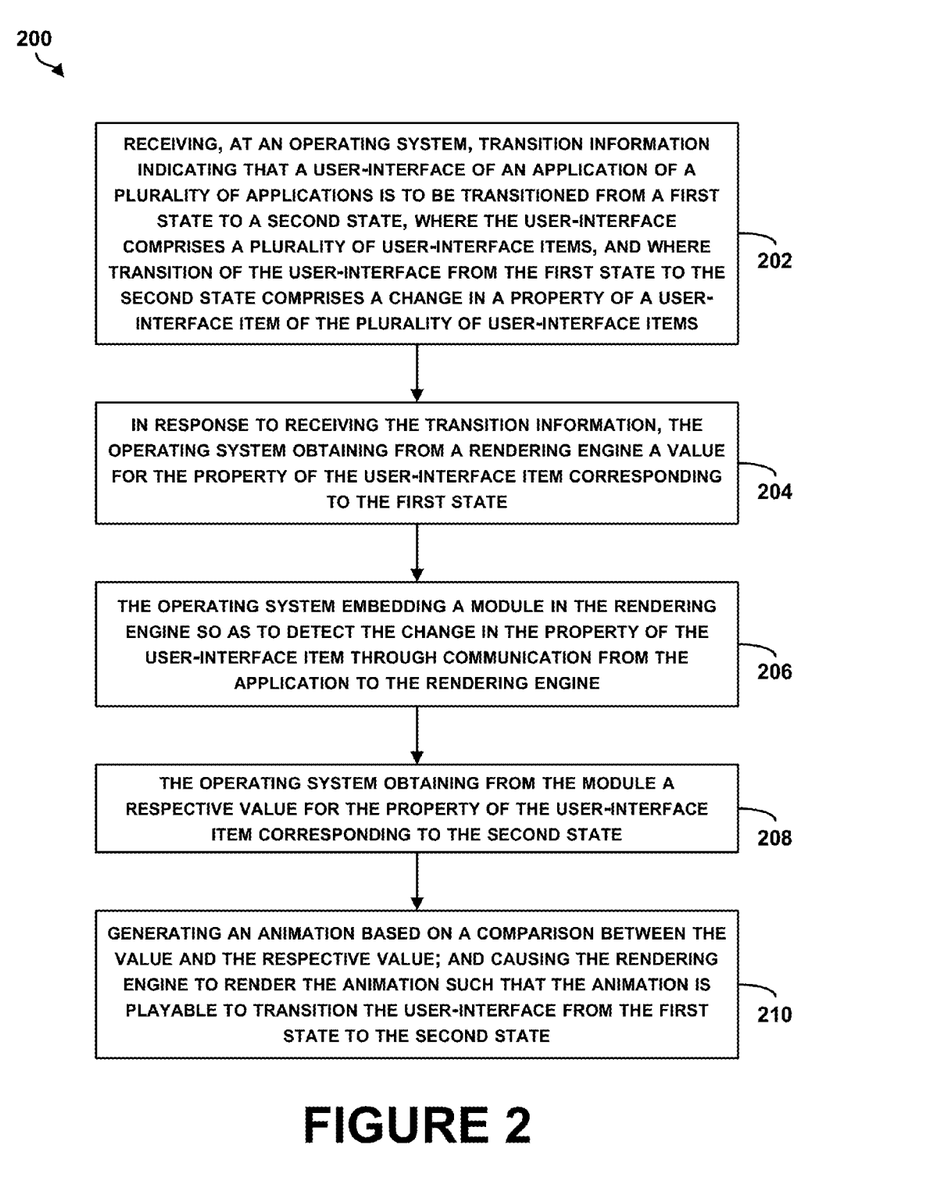
FIG. 2 is a flow chart of a method for generating an animation for transition of a user-interface of an application from a first state and a second state, in accordance with an example embodiment.

FIG. 2 is a flow chart of a method 200 for a method for generating an animation for transition of a user-interface of an application from a first state and a second state, in accordance with an example embodiment. The method 200 may be implemented by the device 100, for example. The method 200 may include one or more operations, functions, or actions as illustrated by one or more of blocks 202-210. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 200 and other processes and methods disclosed herein, each block in FIG. 2 may represent circuitry that is wired to perform the specific logical functions in the process.

The method 200 may be performed by a device having an operating system/platform and a plurality of applications, for example. At block 202, the method 200 includes receiving, at the operating system, transition information indicating that a user-interface of an application of the plurality of applications is to be transitioned from a first state to a second state. The user-interface may include a plurality of user-interface items, and transition of the user-interface from the first state to the second state may include a change in a property of a user-interface item of the plurality of user-interface items.

The operating system configured to be executed on the device (e.g., by a processor of the device) may include software configured to manage hardware resources of the device and provide common services for a plurality of software applications that can run on the device. Several types of operating systems may exist, such as a real-time operating system (a multitasking operating system configured to be execute real-time software applications); a multi-user operating system (configured to allow multiple users to access the device concurrently); a multi-tasking or single tasking operating system (depending on whether one software application or multiple software applications are allowed to run at a given point in time); a distributed operating system (configured to manage a group of independent devices and make them perform as a single device); and an embedded operating system (designed to be used in embedded computing systems and configured to operate on small devices such as mobile phones or PDAs). These operating system types are examples for illustration only and other types exist.

The device may include hardware such as an input device (e.g., a keyboard, a touchscreen, a mouse, etc.), an output device (e.g., a display), a speaker, a microphone, a memory, etc. Other hardware components are possible. To perform functions of the hardware such as input, output, and memory allocation, the operating system may be configured to act as an intermediary between software applications and the hardware. In some examples, the software applications may be executed by the hardware and may be configured to communicate with the operating system and be interrupted by the operating system.

The operating system may be configured to cause different parts or components of the device to work together. For example, the operating system may be configured to process requests made by the software applications to use any of the hardware such as a mouse or keyboard.

A given software application of the software applications may be configured to interact with a user through a user-interface. The user-interface may be configured to request services from the operating system, which may be configured to acquire data from hardware (e.g., a keyboard, mouse, touchscreen, etc.). Example services may include displaying prompts and status messages on output hardware devices, such as a display device. The user-interface may include a graphical user-interface, where a visual environment including visual user-interface items or widgets such as buttons, scroll bars, menus, graphical objects, and other means of facilitating user interaction may be present.

User-interface items may have multiple states. The states may include enabled, disabled, pressed or not pressed, present or not present, unchecked or indeterminate, etc. The operating system may be configured to receive information indicating that the user-interface is to be transitioned from a first state to a second state. In one example, the software application, to which the user-interface belongs, may be configured to communicate such information to the operating system. In another example, the software application may not be involved in providing such information to the operating system directly. The application may indicate the transition to a rendering engine by providing layout of the user-interface in the second state to the rendering engine to indicate that transition is about to happen, for instance. Indicating the transition to the rendering engine may constitute a request to transition the user interface. The rendering engine may be configured to provide a corresponding indication to the operating system to inform the operating system that the user-interface is about to undergo a transition before the rendering engine renders the user-interface in the second state on the display. In this manner, the operating system may receive the request without direct communication from the software application. The operating system may receive the information in different ways with or without involvement or awareness of the software application.

Rendering refers to a process of generating an image from a model (or models in what collectively could be called a scene file), by means of computer programs. Also, the results of such a model can be called a rendering. A scene file may contain objects in a defined language or data structure. The file may contain, for example, geometry, viewpoint, texture, lighting, and shading information as a description of the virtual scene. The data contained in the scene file is then passed to a rendering program to be processed and output to a digital image or raster graphics image file. A Graphics Processing Unit may include a purpose-built device able to assist a Central Processing Unit (e.g., a processor a computing system) in performing complex rendering calculations.

If a scene is to look relatively realistic and predictable under virtual lighting, a rendering software may be configured to operate according to an equation referred to as the rendering equation. The rendering equation is an integral equation in which an equilibrium radiance leaving a point is given as a sum of emitted plus reflected radiance under a geometric optics approximation. The physical basis for the rendering equation is the law of conservation of energy. Assuming that L denotes radiance, at each particular position and direction, an outgoing light $L_0$ is the sum of the emitted light $L_e$ and the reflected light. The reflected light may include the sum of the incoming light $L_i$ from all directions, multiplied by surface reflection and cosine of the incident angle. An example rendering equation may be written in this form:

$$L_0(X, \omega_0, \lambda, t) =$$
$$L_e(X, \omega_0, \lambda, t) + \int_\Omega f_r(X, \omega_i, \omega_0, \lambda, t) L_i(X, \omega_0, \lambda, t)(\omega_i \cdot n) d\omega_i$$

where $\lambda$ is a particular wavelength of light, t is time, X is the location in space, $\omega_0$ is the direction of the outgoing light, $\omega_i$ is the negative direction of the incoming light, $L_0(X, \omega_0, \lambda, t)$ is the total spectral radiance of wavelength $\lambda$ directed outward along direction $\omega_0$ at time t, from a particular position X, $L_e(X,\omega_0,\lambda,t)$ is emitted spectral radiance, $\Omega$ is the unit hemisphere containing all possible values for $$\omega_i, \int_\Omega \ldots d\omega_i$$

is an integral over $\Omega$, $f_r(X,\omega_i,\omega_0,\lambda,t)$ is the bidirectional reflectance distribution function, the proportion of light reflected from $\omega_i$ to $\omega_0$ at position X, time t, and at wavelength $\lambda$, $L_i(X,\omega_0,\lambda,t)$ is spectral radiance of wavelength $\lambda$ coming inward toward X from direction $\omega_i$ at time t, $\omega_i \cdot n$ is a weakening factor of inward irradiance due to incident angle, as the light flux is smeared across a surface which area is larger than the projected area perpendicular to the ray.

The equation is notably linear (i.e., the equation is composed of multiplications and additions, and is spatially homogeneous—is the same in all positions and orientations). The equation also includes spectral and time dependence—$L_0$ may be sampled at or integrated over sections of the visible spectrum to obtain, for example, a trichromatic color sample. A pixel value for a single frame in an animation may be obtained by fixing t; motion blur can be produced by averaging $L_0$ over some given time interval (by integrating over the time interval and dividing by the length of the interval).

The rendering equation may not account for all lighting phenomena, but is a general lighting model for computer-generated imagery. A rendering program may thus be based on a selective mixture of disciplines related to: light physics, visual perception, and mathematics and software development. In some examples, rendering may be the last major step before giving the final appearance to the models and/or animation. A "rendering engine" as used herein may refer to software (e.g., rendering program) and/or hardware (e.g., graphical processing unit) associated with rendering a user-interface of a given software application.

As described above, the user-interface may include several user-interface items (e.g., boxes, buttons, etc.). These user-interface items may have visual properties such as size, color, location with respect to a layout of the user-interface in a particular state, etc. In some examples, the visual properties may be adjustable, dynamic, and customizable. One or more of these properties may change upon transition from a first state to a second state. For example, the size, location, and/or color of the user-interface item may change. In some examples, a user-interface item may disappear when the user-interface item is transitioned, and other user-interface items may appear. These are examples for illustration only and many other changes can occur to a given user-interface item based on type (e.g., box, button, window etc.) of the user-interface item.

At block 204, the method 200 includes, in response to receiving the transition information, the operating system obtaining from a rendering engine a value for the property of the user-interface item corresponding to the first state. Each state may have its own set of properties. For example, a button in a "pressed" state may have certain characteristics such as light color scheme with dark text. The same button may have a dark color scheme with light text when in the "not pressed" state. The rendering engine may be configured to render the user-interface in a given state based on state properties of the user-interface items of the user-interface. The use-interface may currently be rendered in a first state by the rendering engine on a display. The operating system, in response to receiving information indicative of a transition that is about to happen, may be configured to communicate with the rendering engine to obtain values of state properties of the user-interface items in the current (i.e., first) state. For instance, the operating system may obtain values indicative of location, color, size, etc. of each user-interface item of the user-interface currently rendered in the first state. In an example, a value of a given property may be quantitative (e.g., color values using a red, green, blue color spectrum, coordinates indicative of location of a user item, diameter of a circle representing a given user-interface item, etc.). In another example, the value may be qualitative such as a given user-interface item being "centered" relative to a layout of the user-interface. These example values are for illustration only, and other examples are possible.

At block 206, the method 200 includes the operating system embedding a module in the rendering engine so as to detect the change in the property of the user-interface item through communication from the application to the rendering engine. In addition to receiving the value of the property of the user-interface item upon receiving the transition information, the operating system may be configured to embed a software module, such as the pre-draw listener 116 mentioned above with respect to FIG. 1, into the rendering engine so as to detect the change in the property. The software application may be configured to communicate with the rendering engine to provide state properties of the user-interface item in the second state. The software module or pre-draw listener may be configured to observe or monitor such communication in order to capture the value of the property in the second state of the user-interface and provide the value to the operating system prior to the rendering engine rendering or drawing the user-interface in the second state.

In examples, the operating system may cause the pre-draw listener to implement a particular protocol that enables the pre-draw listener to interface with the rendering engine or interface with communication between the application and the rendering engine so as to listen to and capture user-interface change information related to the transition from the first state to the second state. The protocol allows the pre-draw listener to exchange messages with the rendering engine that can be recognized by the rendering engine. The protocol may include or define arguments that the messages may be supplied with from the pre-draw listener and the rendering engine, and may also include or define types of the results that the messages return to the pre-draw listener, for example. The protocol may also define how to handle exceptional situations such as new types of user-interface items. In some examples, the pre-draw listener also may be configured to register with the rendering engine to declare or inform the rendering engine that the pre-draw listener is embedded in the rendering engine so as to detect a particular event (e.g., transition) and capture particular information related to the transition from the first state to the second state for a user-interface of a particular application. The operating system may be configured to embed a given pre-draw listener for each corresponding software application, or alternatively embed a single pre-draw listener for the plurality of software applications (or a subset of the plurality of software applications) of the device.

In one example, the pre-draw listener may be configured to monitor communication between the application and the rendering engine to detect an imminent user-interface transition and capture related information. In another example, the rendering engine, upon receiving the information from a given software application regarding state properties of the user-interface items in the second state, may provide the information to the pre-draw listener.

At block 208, the method 200 includes the operating system obtaining from the module a respective value for the property of the user-interface item corresponding to the second state. The pre-draw listener (i.e., the software module embedded by the operating system into the rendering engine) may be configured to capture information communicated from the application to the rendering engine and associated with values of properties of various user-interface items of the user-interface in the second state. The operating system may be configured to receive the values from the pre-draw listener. For example, the operating system may be configured to add a callback subroutine into the listener so as to handle inputs received by the listener. When the listener receives or detects changes to the user-interface, the callback subroutine is called back by the operating system to provide the changes to the operating system.

As an example, the size or color of a box in the user-interface may change from the first state to the second state. The operating system may have received the value of the size or color of the box in the first state as described at block 204. The pre-draw listener may be configured to capture a respective value for the size or color of the box in the second state and provide the respective value to the operating system. In this manner, the operating system has information related to the value of the property of the user-interface item in the first state currently rendered as well as the respective value of the property of the user-interface item in the second state that is yet to be rendered.

At block 210, the method 200 includes generating an animation based on a comparison between the value and the respective value; and causing the rendering engine to render the animation such that the animation is playable to transition the user-interface from the first state to the second state. The operating system may be in communication with an animation engine such as the animation engine 118 illustrated in FIG. 1. The animation engine may be configured to compare the first state and the second state of the user-interface. Based on differences in visual properties of the user-interface between the states (e.g., a difference in color or size of a user-interface item), the animation engine may be configured to generate an animation to be played to transition the user-interface from the first state to the second state.

An animation engine may include software code that generates and drives an animation. The animation engine may be configured to receive drawing data (e.g., layout of a user-interface in the first state and the second state), select animation arrangements and techniques appropriate to given user-interface items of the user-interface, satisfy real-time drawing requirements, and manage memory allocation for animated items, for example. In an example, the animation engine may be configured to specify properties of the transition such as how long the transition should last and how the visual element should appear before and after the transition. For instance, the animation engine may be configured to determine multiple frames that can be rendered and played to transition the user-interface from a frame representing a layout corresponding to the first state to an end frame representing a layout corresponding to the second state. The animation engine may provide information related to the multiple frames to the rendering engine, which may be configured to render the multiple frames on a display to transition the user-interface from the first state to the second state.

In one example, the animation engine may also determine and provide to the rendering engine information associated with timing of the animation, i.e., when to start the animation, amount of time between each frame, total amount of time playing the animation may take, etc.

In another example, such timing information may be determined by the rendering engine and the animation engine may not be aware of which platform-specific functions are used for implementing timing and implementation of the animation. In some examples, the animation engine may be separate or independent from the rendering engine; however, in other examples, the animation engine may be part of the rendering engine or vice versa.

As indicated above, each state of a user-interface item may have different properties or property values. The animation engine may be configured to determine the differences in these values and generate an animation that effectively applies incremental changes to the user-interface item in the first state until the item has been transitioned to the second state. Several animation techniques may be available to the animation engine. The animation engine may be configured to determine an appropriate animation for each user-interface item that may experience a change in visual properties during a transition. For example, a first user-interface item may disappear (i.e., is not part of a layout of the user-interface in the second state), a second user-interface item that was not part of the layout of the user-interface in the first state may appear in the second state, a third user-interface item may change color or size, or move to a different location. A different animation or transition may be selected or determined for each of these three user-interface items. Additionally, a different animation may be appropriate for different types of properties. For example, an animation that is appropriate for a change in color may not be appropriate for an animation of a change in size or location, and vice versa. Thus, the operating system and/or the animation engine may be configured to determine an appropriate animation from a list of available animations based on a type of the property to be changed.

In some examples, not all properties of a given user-interface item will change from the first state to the second state. A subset of properties may change while others may not—In these examples, the operating system may be configured to compare properties of the user-interface item in the first state and the second state. Based on the comparing, the operating system may identify the properties that change upon transition from the first state and the second state, without input (or without direct communication) from the application, and provide the identified properties to the animation engine to generate the animation.

Upon determining appropriate animations and generating multiple frames to transition the user-interface from the first state to the second state, the animation engine may be configured to provide to the rendering engine information related to the animation. For example, the information may include parameters indicative of the visual properties that are to be animated and corresponding values for the visual properties for each frame of the multiple frames. The rendering engine may be configured to render the multiple frames showing incremental changes and thus generating an animation based on the information provided by the animation engine. Generating a display of the multiple frames over a period of time is effective to cause the animation to be played on the display to transition the user-interface from the first state to the second state.

In this manner, the operating system receives an indication that a user-interface of the software application is to be transitioned from a first state to a second state and accordingly initiate the method 200 to generate the animation without input (or without direct communication) from the software application. No, or minimal, additional code or resources are added to the software application by the developer to cause the animation. Thus, the burden of generating the animation is shifted from a developer of the software application to the operating system/platform of the device. In some examples, the software application may be configured to send a request to the operating system to initiate an animation; however, generation of the animation may then be performed as described in the method 200 without additional input from the software application.

Further, the operating system is common to all software applications of the device, and thus the operating system is configured generate a transition animation for any of the software applications of the device to enhance user experience. In some examples, the operating system may be configured to continuously monitor the software applications to determine if a transition is about to occur and generate an animation accordingly. However, in other example, the operating system may not be continuously monitoring the software applications, and may be configured to receive a request to switch into a mode that enables the operating system to monitor the software applications and generate the animations. The request may be from a user of the device or from one or more of the software applications. For example, based on the request, the operating system may be configured to switch to a "listening" mode in which the operating system observes and monitors the software applications currently active on the device to determine whether a user-interface transition is about to happen and initiate the method 200 accordingly.

Figure 3A:
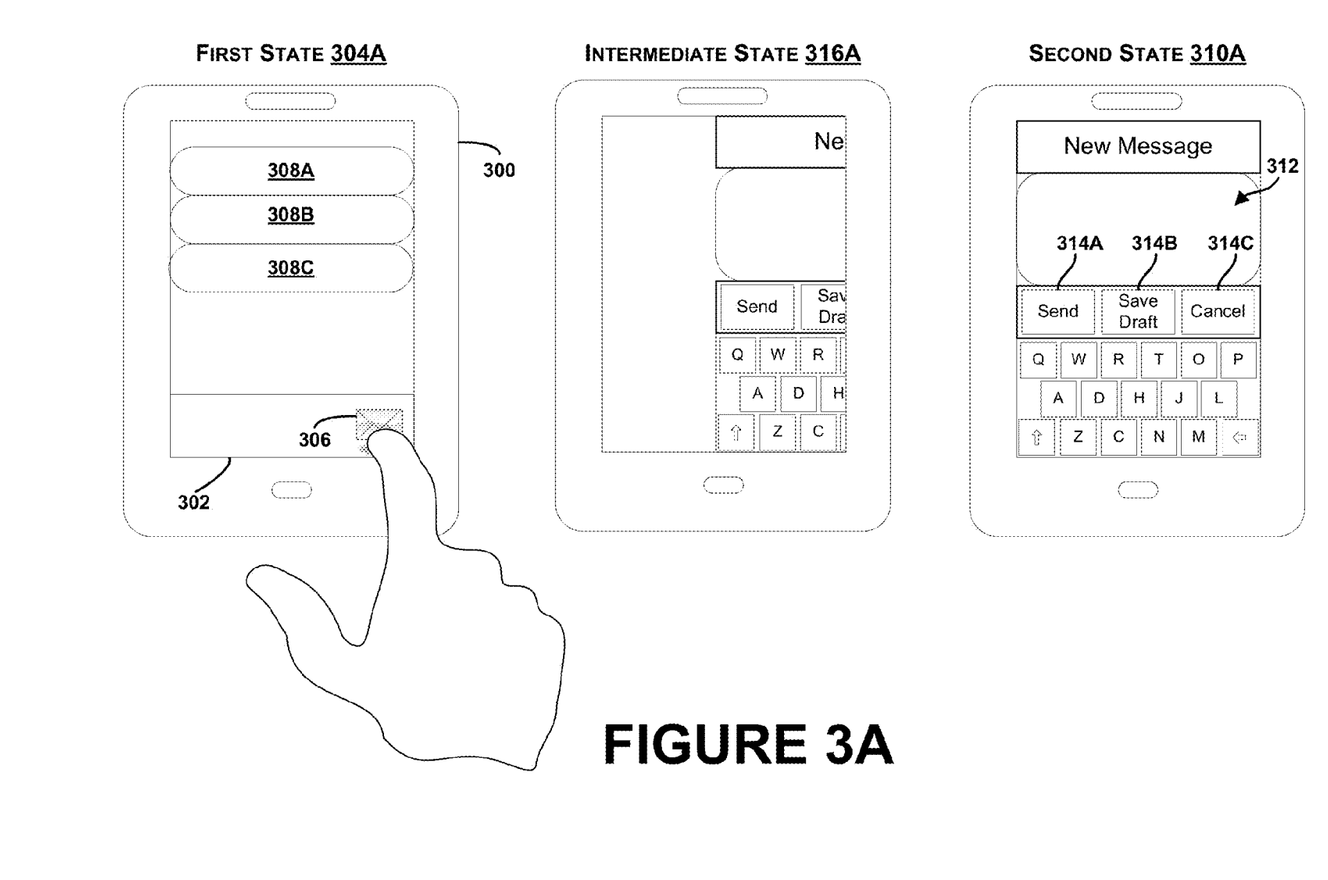
FIG. 3A illustrates an example of animating a transition of a user-interface from a first state to a second state, in accordance with an example embodiment.

FIG. 3A illustrates an example of animating a transition of a user-interface from a first state to a second state, in accordance with an example embodiment. An operating system of the device 300 may be configured to be executed on the device 300 and support a plurality of software applications. FIG. 3A shows the device 300 including a display 302 (e.g., a touchscreen), and running an email software application as an example. First state 304A shown in FIG. 3A depicts a user-interface of the email software application having a user-selectable icon 306 and user-selectable on-screen buttons 308A, 308B, and 308C.

When the icon 304A is selected (e.g., clicked), the user-interface transitions from the first state 304A to a second state 310A depicted in FIG. 3A associated with composing an email (a new message). In the second state 310A, the icon 306 and the buttons 308A-C disappeared and other user-interface items appeared such as screen space 312 for writing text, buttons 314A, 314A, and 314A, and a virtual keyboard on the display 302 for composing the email.

The device 300 may be configured to implement the method 200 such that the operating system of the device 300 generates an animation to transition the user-interface from the first state 304A to the second state 310A. For example, the operating system may be configured to generate one or more intermediate states such as intermediate state 316A to cause an animation that is playable on the display 302 to transition the user-interface from the first state 304A to the second state 310A. For example, the animation may include the icon 306 and the buttons 308A-C disappearing (perhaps fading away gradually), and the new items such as the screen space 312, buttons 314A, 314A, and 314A, and the virtual keyboard to appear gradually flying from the right. The intermediate state 316A depicts a frame of multiple frames that can be generated to achieve the animation and transition; thus, some of the items of the second state 310A appear partially in the intermediate state 316A. Each item may have an associated animation different from other items. For example, the buttons 314A-C may, instead of flying from the right, appear gradually by starting at a certain translucence level and gradually changing the translucence level to become clearer as the animation proceeds. Different animation techniques can be used, and FIG. 3A depicts an example for illustration only. As described with respect to FIGS. 1 and 2, the operating system of the device 300 may be configured to generate the animation with no input from the software application and without tying resources of the software application.

Figure 3B:
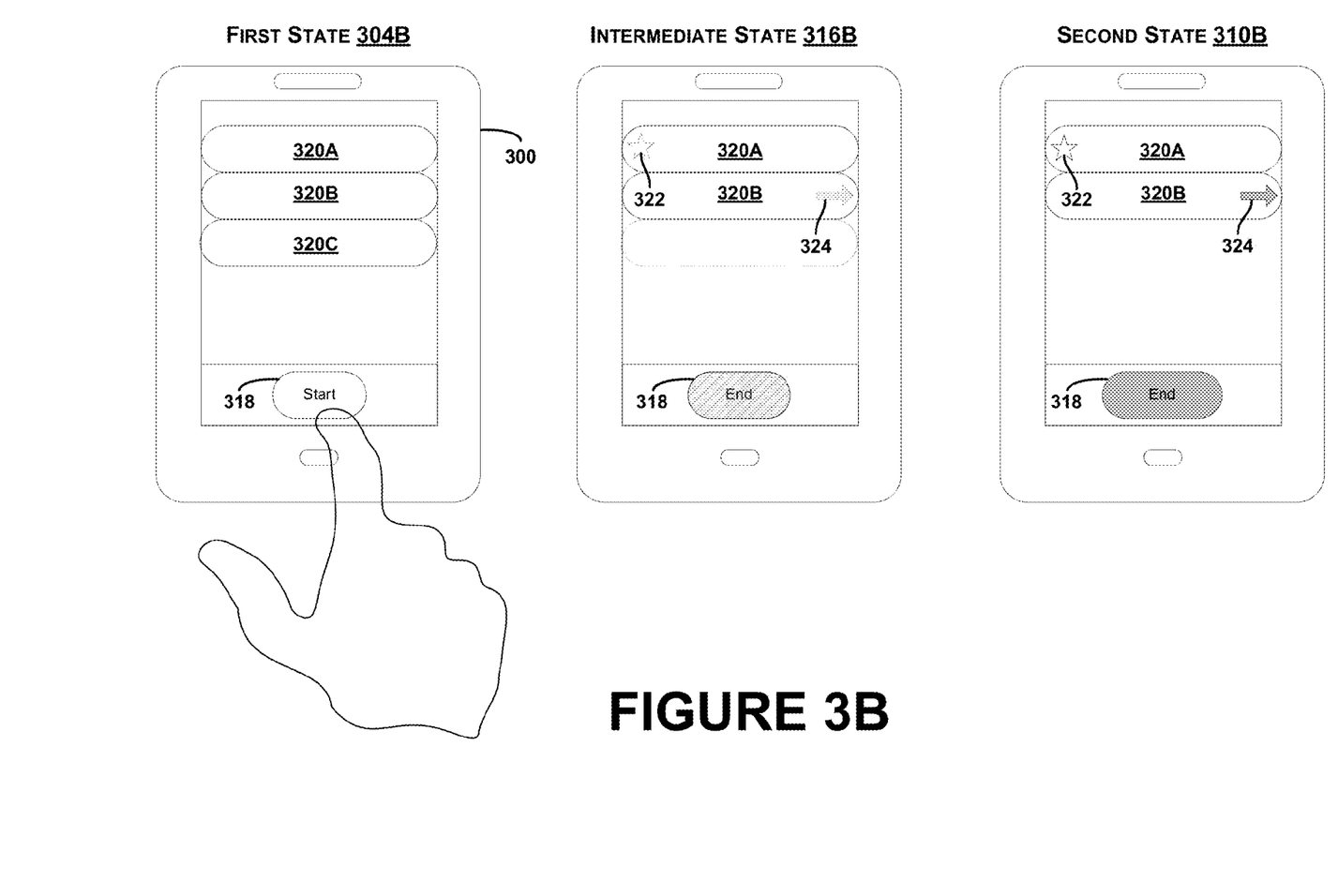
FIG. 3B illustrates another example of animating a transition of a user-interface from a first state to a second state, in accordance with an example embodiment.

FIG. 3B illustrates another example of animating a transition of a user-interface from a first state to a second state, in accordance with an example embodiment. FIG. 3B shows the device 300 running another software application as an example. First state 304B shown in FIG. 3B depicts a user-interface of the application having a user-selectable start button 318 and other user-selectable buttons 320A, 320B, and 320C.

When the start button 318 is selected (e.g., clicked), the user-interface transitions from the first state 304B to second state 310B depicted in FIG. 3B. In the second state 310B, size of the start button 318 increased and the text changed to "End" instead of "Start." Button 320 disappeared, and star icon 322 and arrow 324 appeared on buttons 320A and 320B, respectively.

The device 300 may be configured to implement the method 200 such that the operating system of the device 300 generates an animation to transition the user-interface from the first state 304B to the second state 310B. For example, the operating system of the device 300 may be configured to generate one or more intermediate states such as intermediate state 316B to cause an animation that is playable on the display 302 to transition the user-interface from the first state 304B to the second state 310B. For example, animating transition for the start button 318 may include a gradual increase in size and a gradual change in color and fill type. For instance, the animation engine may be configured to interpolate between a size of the button 318 in the first state 304B and a corresponding final size of the button 318 in the second state 310B to determine appropriate incremental changes in the size to animate the transition over a series of frames or intermediate states such as the intermediate state 316B. Thus, in the intermediate state 316B, the size of the button 318 is between a respective size in the first state 304B and a respective size in the second state 310B. In a similar manner, the star icon 322 and arrow 324 may appear gradually (e.g., fade in) by changing or interpolating a level of translucency or transparency over a series of intermediate states such as the intermediate state 316B. As shown in the intermediate state 316B, the star icon 322 and the arrow 324 appear relatively faded compared to their respective appearances in the second state 310B.

Animation techniques and examples described in FIGS. 3A and 3B are examples for illustration only, and several other animation techniques can be used based on type of the software application and type of user-interface items associated with the user-interface of the software application.

Figure 4:
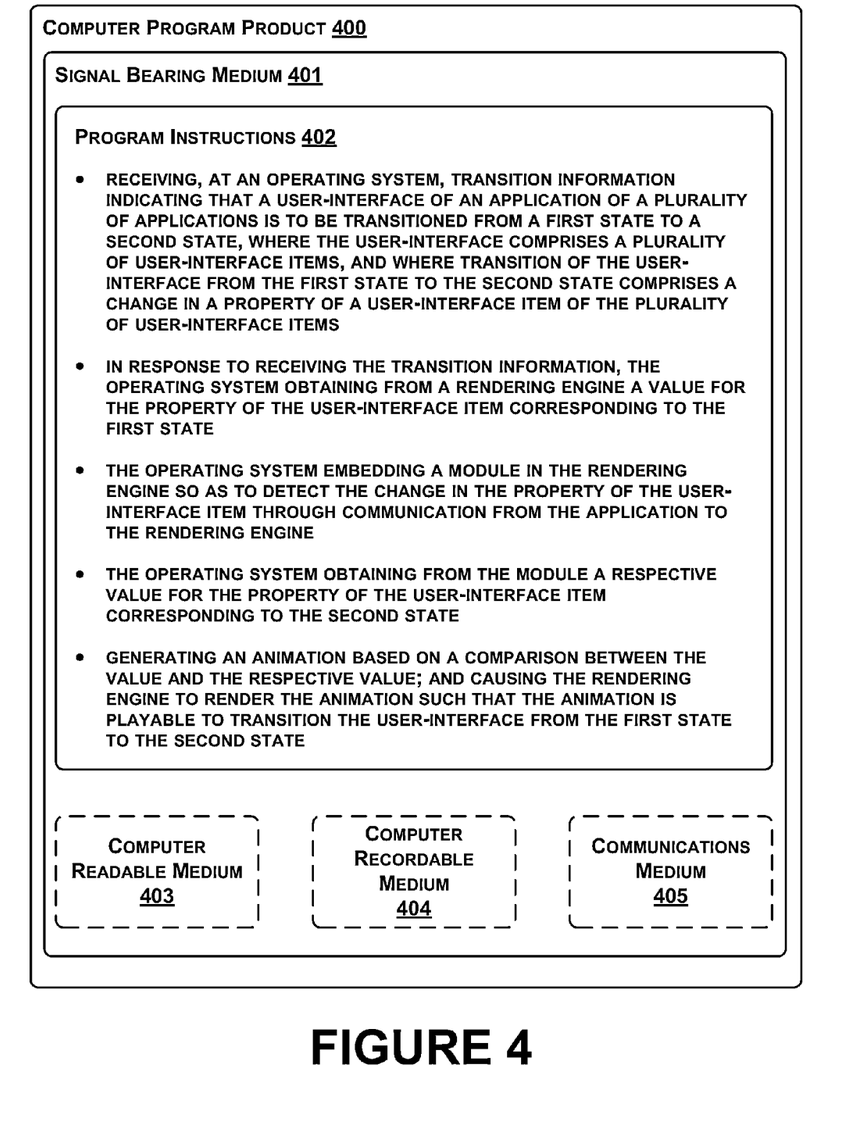
FIG. 4 is a schematic illustrating a conceptual partial view of a computer program, in accordance with an example embodiment.

In some embodiments, the disclosed methods may be implemented as computer program instructions encoded on a computer-readable storage media in a machine-readable format, or on other non-transitory media or articles of manufacture. FIG. 4 is a schematic illustrating a conceptual partial view of an example computer program product 400 that includes a computer program for executing a computer process on a computing device, arranged according to at least some embodiments presented herein. In one embodiment, the example computer program product 400 is provided using a signal bearing medium 401. The signal bearing medium 401 may include one or more program instructions 402 that, when executed by one or more processors may provide functionality or portions of the functionality described above with respect to FIGS. 1-3. Thus, for example, referring to the embodiments shown in FIG. 2, one or more features of blocks 202-210 may be undertaken by one or more instructions associated with the signal bearing medium 401. In addition, the program instructions 402 in FIG. 4 describe example instructions as well.

In some examples, the signal bearing medium 401 may encompass a computer-readable medium 403, such as, but not limited to, a hard disk drive, a Compact Disc (CD), a Digital Video Disk (DVD), a digital tape, memory, etc. In some implementations, the signal bearing medium 401 may encompass a computer recordable medium 404, such as, but not limited to, memory, read/write (R/W) CDs, R/W DVDs, etc. In some implementations, the signal bearing medium 401 may encompass a communications medium 405, such as, but not limited to, a digital and/or an analog communication medium (e.g., a fiber optic cable, a waveguide, a wired communications link, a wireless communication link, etc.). Thus, for example, the signal bearing medium 401 may be conveyed by a wireless form of the communications medium 405 (e.g., a wireless communications medium conforming to the IEEE 802.11 standard or other transmission protocol).

The one or more programming instructions 402 may be, for example, computer executable and/or logic implemented instructions. In some examples, a computing device such as the computing device described with respect to FIGS. 1-3B may be configured to provide various operations, functions, or actions in response to the programming instructions 402 conveyed to the computing device by one or more of the computer readable medium 403, the computer recordable medium 404, and/or the communications medium 405. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a device having an operating system and a plurality of applications, the method comprising:
    receiving, at the operating system, transition information indicating that a user-interface of an application of the plurality of applications is to be transitioned from a first state to a second state, wherein the user-interface comprises a plurality of user-interface items, and wherein transition of the user-interface from the first state to the second state comprises a change in a property of a user-interface item of the plurality of user-interface items;
    in response to receiving the transition information, the operating system obtaining from a rendering engine a value for the property of the user-interface item corresponding to the first state;
    the operating system embedding a module in the rendering engine, wherein embedding the module comprises causing the module to register with the rendering engine to declare that the module is embedded in the rendering engine so as to detect the transition of the user-interface of the application from the first state to the second state through communication from the application to the rendering engine;
    the operating system obtaining from the module a respective value for the property of the user-interface item corresponding to the second state;
    generating an animation based on a comparison between the value and the respective value; and
    causing the rendering engine to render the animation such that the animation is playable to transition the user-interface from the first state to the second state.

2. The method of claim 1, further comprising:
    switching from a normal mode of the operating system to a listening mode of the operating system, wherein the listening mode is common to the plurality of applications, and wherein the listening mode comprises detecting changes in user-interfaces of the plurality of applications.

3. The method of claim 1, wherein embedding the module further comprises:
    causing the module to implement a particular protocol that enables the module to interface with the communication from the application to the rendering engine so as to capture the respective value for the property of the user-interface item corresponding.

4. The method of claim 1, wherein generating the animation comprises generating the animation by the operating system without direct communication from the application to the operating system.

5. The method of claim 1, wherein the value is numerical or qualitative.

6. The method of claim 1, wherein the user-interface item comprises a plurality of visual properties, and wherein the property is a visual property of the plurality of visual properties, the method further comprising:
    determining by the operating system a given visual property of the plurality of visual property appropriate for animation and excluding from animation other visual properties of the plurality of visual properties.

7. The method of claim 1, wherein receiving the transition information comprises receiving the transition information based on a request from the application to generate the animation.

8. The method of claim 1, further comprising:
    the operating system comparing properties of the user-interface item in the first state and the second state; and
    based on the comparing, identifying the property that changes upon transition from the first state and the second state.

9. The method of claim 1, wherein generating the animation based on the comparison between the value and the respective value comprises:
    determining an appropriate animation from a list of available animations based on a type of the property.

10. The method of claim 1, wherein generating the animation comprises causing the user-interface item to change shape, size or color, causing the user-interface item that is absent from the user-interface in the first state to appear in the second state, or causing the user-interface item that is present in the first state to disappear in second state.

11. A non-transitory computer readable memory having stored thereon instructions that, when executed by one or more processors of a computing device having a plurality of applications, cause the computing device to perform functions comprising:
    receiving transition information indicating that a user-interface of an application of the plurality of applications is to be transitioned from a first state to a second state, wherein the user-interface comprises a plurality of user-interface items, and wherein transition of the user-interface from the first state to the second state comprises a change in a property of a user-interface item of the plurality of user-interface items;
    in response to receiving the transition information, obtaining from a rendering engine a value for the property of the user-interface item corresponding to the first state;
    embedding a module in the rendering engine, wherein embedding the module comprises causing the module to register with the rendering engine to declare that the module is embedded in the rendering engine so as to detect the transition of the user-interface of the application from the first state to the second state through communication from the application to the rendering engine;
    obtaining from the module a respective value for the property of the user-interface item corresponding to the second state;
    generating an animation based on a comparison between the value and the respective value; and
    causing the rendering engine to render the animation such that the animation is playable to transition the user-interface from the first state to the second state.

12. The non-transitory computer readable memory of claim 11, wherein the functions further comprise:
 switching the computing device from a normal mode of operation into a listening mode of operation, wherein the listening mode is common to the plurality of applications, and wherein the listening mode comprises detecting changes in user-interfaces of the plurality of applications.

13. The non-transitory computer readable memory of claim 11, wherein the function of generating the animation comprises generating the animation without direct communication from the application to the operating system.

14. The non-transitory computer readable memory of claim 11, wherein the value is numerical or qualitative.

15. The non-transitory computer readable memory of claim 11, wherein the user-interface item comprises a plurality of visual properties, and the property is a visual property of the plurality of visual properties, and wherein the functions further comprise:
 determining a given visual property of the plurality of visual properties appropriate for animation and excluding from animation other visual properties of the plurality of visual properties.

16. The non-transitory computer readable memory of claim 11, wherein the functions further comprise:
 comparing properties of the user-interface item in the first state and the second state; and
 based on the comparing, identifying the property that changes upon transition from the first state and the second state.

17. The non-transitory computer readable memory of claim 11, wherein the function of generating the animation based on the comparison between the value and the respective value comprises:
 determining an appropriate animation from a list of available animations based on a type of the property.

18. The non-transitory computer readable memory of claim 11, wherein the function of embedding the module comprises:
 causing the module to implement a particular protocol that enables the module to interface with the communication from the application to the rendering engine so as to capture the respective value for the property of the user-interface item.

19. A device having a plurality of applications, the device comprising:
 one or more processors; and
 memory configured to store instructions, that when executed by the one or more processors, cause the device to perform functions comprising:
  receiving transition information indicating that a user-interface of an application of the plurality of applications is to be transitioned from a first state to a second state, wherein the user-interface comprises a plurality of user-interface items, and wherein transition of the user-interface from the first state to the second state comprises a change in a property of a user-interface item of the plurality of user-interface items;
  in response to receiving the transition information, obtaining from a rendering engine a value for the property of the user-interface item corresponding to the first state;
  embedding a module in the rendering engine, wherein embedding the module comprises causing the module to register with the rendering engine to declare that the module is embedded in the rendering engine so as to detect the transition of the user-interface of the application from the first state to the second state through communication from the application to the rendering engine;
 obtaining from the module a respective value for the property of the user-interface item corresponding to the second state;
 generating an animation based on a comparison between the value and the respective value; and
 causing the rendering engine to render the animation such that the animation is playable to transition the user-interface from the first state to the second state.

20. The device of claim 19, wherein the functions further comprise:
 causing the module to implement a particular protocol that enables the module to interface with the communication from the application to the rendering engine so as to capture the respective value for the property of the user-interface item.

\* \* \* \* \*